United States Patent [19]
Nevers
[11] Patent Number: 4,701,303
[45] Date of Patent: Oct. 20, 1987

[54] ODOR-FADING PREVENTION FROM ORGANOSULFUR-ODORIZED LIQUEFIED PETROLEUM GAS

[76] Inventor: Ashley D. Nevers, 569 Crossfield Rd., King of Prussia, Pa. 19406

[21] Appl. No.: 863,332

[22] Filed: May 15, 1986

[51] Int. Cl.[4] .............................................. B01J 11/18

[52] U.S. Cl. ...................................... 422/41; 427/231; 427/239

[58] Field of Search ...................... 422/41, 40; 514/52; 427/231, 232, 234, 235, 239, 435, 156

[56] References Cited

U.S. PATENT DOCUMENTS 3,545,949 12/1970 Oister ..................................... 44/52
3,826,631 7/1974 Nevers .................................... 44/52

OTHER PUBLICATIONS

Gramshaw et al., "Deactivation of a Metal Transfer Line between a Gas Chromatographic Column and a Flame Photometric Detector", *Progress in Flavor Research, Applied Science Publishers,* 1979, pp. 129–134.

*Primary Examiner*—Barry S. Richman
*Assistant Examiner*—William R. Johnson

[57] ABSTRACT

A process for preventing odor-fading of liquefied petroleum gas odorized with organosulfur compounds wherein the gas is stored in containers having new or recently cleaned interior surfaces, such surfaces having been pretreated with benzotriazole, tolyl triazole, mercaptobenzothiazole, benzothiazyl disulfide or mixtures thereof.

8 Claims, No Drawings

ODOR-FADING PREVENTION FROM ORGANOSULFUR-ODORIZED LIQUEFIED PETROLEUM GAS

BACKGROUND OF THE INVENTION

This invention relates to a process for the prevention of odor-fading from organosulfur chemical-odorized liquefied petroleum gas (LPG) stored in carbon steel containers. More particularly, it relates to the process of deactivating the steel surface of a new or recently cleaned storage container for organosulfur chemical-odorized LPG by treating said surface with a deactivating agent prior to the exposure of said walls to said LPG.

Commercial LPG is customarily odorized with a organosulfur odorant, very commonly ethyl mercaptan. Containers for storing LPG are usually steel or steel-lined cylinders or tanks which, when new or recently cleaned, have inner surfaces which may react with the sulfur odorant to form a complex chemical build-up on the walls of the container. As a consequence of this complex formation, there is a depletion of the odorant level in the LPG. This condition, sometimes referred to as "odor-fading", can be hazardous to those unknowingly exposed to LPG in the atmosphere.

PRIOR ART

It is known that the integrity of trace amounts of n-butyl mercaptan is well-preserved in a gas chromatographic transfer system where the stainless steel chromatographic column is first treated with a solution of benzotriazole in an inert solvent such as isopropanol[1].

[1] - Gramshaw, J. W. and Hussain, A., "Deactivation of a Metal Transfer Line between a Gas Chromatographic Column and a Flame Photometric Detector" - *Progress in Flavor Research*, Applied Science Publishers, 1979.

In addition, benzotriazole, tolyl triazole, mercaptobenzothiazole and similar chemical compounds are well known corrosion inhibitors often employed in lubricant compositions, engine coolers, specialty cleaners, hydraulic fluids and the like, especially on copper or copper-bearing substrates.

STATEMENT OF THE INVENTION

This invention is a process for the prevention of odor-fading from organosulfur-odorized liquefied petroleum gas stored in containers having active interior steel surfaces which comprises treating said surfaces with a deactivating amount of benzotriazole, tolyl triazole, mercapatobenzothiazole, benzothiazyl disulfide or mixtures thereof, preferably drying the container, and charging the container with said liquefied petroleum gas odorized with ethyl mercaptan, thiophane, dimethyl sulfide, or other reduced organosulfur compounds containing one to five carbon atoms.

DETAILED DESCRIPTION OF THE INVENTION

This process reduces or eliminates odor-fading from sulfur-odorized LPG stored in containers having active (new or recently cleaned) interior steel surfaces. By "active . . . interior steel surfaces" is meant inner steel surfaces of containers which surfaces have not been deactivated to reacting with sulfur chemicals to form a chemical complex build-up thereon. Such surfaces may occur in containers which have either never been used to store organosulfur-odorized LPG, used only several times for such storage, or have recently been cleaned during extended service. Additionally, containers which have been treated either chemically or mechanically to remove the deactivating chemical complex are included within the term.

The organosulfur-odorants used herein include ethyl mercaptan, thiophane, and dimethyl sulfide. Ethyl mercaptan, because of its greater use as a commercial odorant, and because of the inherent reactivity of mercaptans as a class, can benefit the most by the metal-deactivating process of this invention. Ethyl mercaptan, thiophane and dimethyl sulfide are generally employed as odorants for LPG, either individually or in blends with each other. The organosulfur-odorant is usually used to obtain an initial odorant loading of the LPG of between about 25 and 150 ppm (wt., liquid phase) depending upon the odorant employed.

As taught in U.S. Pat. No. 3,826,631, ethyl mercaptan and dimethyl sulfide may be combined with an inert chemical capable of forming a minimum boiling point azeotrope. For example, these inert chemicals include methyl formate, n-pentane, isopentane, amylene, isoamylene, chloropropane or mixtures of these. The azeotrope-former is used in an amount which is at least sufficient to form an azeotrope with the amount of organosulfur-odorant to be mixed with the LPG and preferably in a slight excess as described in the above-mentioned U.S. Pat. No. 3,826,631.

LPG or liquefied petroleum gas is a well known substance consisting of propane, butane, isobutane and mixtures of these and other lower hydrocarbons in various proportions.

The deactivating chemicals that are used in the process of this invention are benzotriazole, tolyl triazole, mercaptobenzothiazole, and benzothiazyl disulfide. These materials are solids which must be converted to liquid form, preferably by dissolving in an inert solvent, for practical application to the steel inner surface of the container for LPG. Solvents for this purpose include, for example, alcohols, ethers, ketones, esters, and similar liquids. More particularly, they include, for example, isopropanol, propylene glycol, acetone, and the like.

The concentration in the solvent solution will depend on the particular deactivator employed and the length of time the inner steel surfaces of the container for LPG are exposed to the solution. In general, a concentration of deactivator in the solvent will range from about 5% up to the weight limit of solubility of the deactivating chemical in the selected solvent. Preferably, from about 20° to about 30% by weight of the deactivator in the solvent may be employed.

The deactivator solution is used in an amount which will at least coat the walls of the container and duration of the deactivator treatment can vary from as little as about 15 minutes up to many hours, for example, a full day or more. However, a range of from several hours up to about 24 hours, depending on the deactivator concentration and temperature of the solution or steel walls during treatment, is advantageous. The temperature during treatment can range from room temperature up to that above which the solvent boils. A temperature within the range of from about 20° to about 50° C. is generally satisfactory.

After treatment of the container walls with the deactivator solution, the solution is drained and the container may be purged with an inert gas, for example nitrogen or odorized propane, or simply allowed to dry.

The following examples demonstrate the process of this invention.

EXAMPLE 1

A 20% by weight solution of benzotriazole in isopropanol was prepared and 50 ml. of this solution was charged into a new 360 ml. carbon steel container designed for LPG storage. The container was rolled in place for 24 hours, drained, capped and allowed to stand for 48 hours. After 48 hours, the cap was removed and the container first gently purged with nitrogen for about 5 minutes, flushed twice with liquefied petroleum gas (~5–30 sec. exposure) and then filled under pressure to 75% of the container volume.

EXAMPLE 2

100 ml of a 20% by weight solution of benzotriazole in isopropanol was charged to a new 360 ml. carbon steel container designed for LPG storage. The container was rolled in place overnight (21 hours) drained and purged for 15 minutes, twice, immediately following drainage. The container was then filled under pressure with LPG to 77% of the container volume.

Tolyl triazole, mercaptobenzothiazole, benzothiazyl disulfide, and mixtures of these deactivators with each other and with benzotriazole can be advantageously employed to replace the benzotriazole in Examples 1 and 2.

The use of ethyl mercaptan and similar organosulfur-odorants to precondition or deactivate the inner steel surfaces of containers for LPG has been contemplated, however, such method is not practical because of the highly objectionable odor of this material. Avoiding escape of the odor in the treatment process would require expensive handling equipment and, should the odorant accidentally escape, a severe environmental problem could ensue.

I claim:

1. A process for the prevention of odor-fading from organosulfur-odorized LPG stored in containers having active interior steel surfaces comprising treating said surfaces with a deacativating amount of benzotriazole, tolyl triazole, mercaptobenzothiazole, benzothiazyl disulfide, or mixtures thereof, and loading said container with liquefied petroleum gas odorized with at least one reduced organosulfur compounds containing one to five carbon atoms.

2. The process of claim 1 wherein said surfaces are treated with a solvent solution to benzotriazole, tolyl triazole, mercaptobenzothiazole, benzothiazyl disulfide, or mixtures thereof.

3. The process of claim 2 wherein the container is dried prior to loading with the liquefied petroleum gas.

4. The process of claim 3 wherein the liquefied petroleum gas is odorized with ethyl mercaptan.

5. The process of claim 3 wherein said surfaces are treated with a solvent solution of benzotriazole.

6. The process of claim 5 wherein the solvent is isopropanol.

7. The process of claim 6 wherein the liquefied petroleum gas is odorized with ethyl mercaptan.

8. The process of claim 7 wherein the ethyl mercaptan is combined with an organic azeotropic agent miscible with and forming a minimum boiling point azeotrope with said ethyl mercaptan.

* * * * *